United States Patent
Burnett

(10) Patent No.: US 12,150,433 B2
(45) Date of Patent: Nov. 26, 2024

(54) BEE NOURISHMENT SYSTEM

(71) Applicant: Timothy Burnett, Bend, OR (US)

(72) Inventor: Timothy Burnett, Bend, OR (US)

( * ) Notice: Subject to any disclaimer, the term of this patent is extended or adjusted under 35 U.S.C. 154(b) by 0 days.

(21) Appl. No.: 17/827,417

(22) Filed: May 27, 2022

(65) Prior Publication Data
US 2022/0378021 A1 Dec. 1, 2022

Related U.S. Application Data

(60) Provisional application No. 63/194,024, filed on May 27, 2021.

(51) Int. Cl.
*A01K 53/00* (2006.01)
*A01K 47/00* (2006.01)

(52) U.S. Cl.
CPC .............. *A01K 53/00* (2013.01); *A01K 47/00* (2013.01)

(58) Field of Classification Search
CPC ................................ A01K 53/00; A01K 47/00
See application file for complete search history.

(56) References Cited

U.S. PATENT DOCUMENTS

| | | | | |
|---|---|---|---|---|
| 4,412,363 A | * | 11/1983 | Robson | A01K 47/06 6/4 R |
| 2014/0323015 A1 | * | 10/2014 | Anderson | A01K 53/00 |
| 2021/0378218 A1 | * | 12/2021 | Riley | A01K 53/00 |
| 2021/0400925 A1 | * | 12/2021 | Harvey | A01K 47/06 |
| 2022/0132812 A1 | * | 5/2022 | Stach | A01K 47/06 |

* cited by examiner

*Primary Examiner* — Joshua J Michener
*Assistant Examiner* — Henry Hooper Mudd
(74) *Attorney, Agent, or Firm* — Donn K. Harms

(57) ABSTRACT

A bee nutrition device is configured with a frame positionable between the brood chamber and honey super components of a stacked bee hive. Fondant and/or water or nurturing liquid is positionable within trays located within a recess located with a sidewall of the frame of the device. Access into and out of the recess for bees can be regulated by a translating member having openings therein which can be selectively aligned with the central opening communicating through the bottom surface of the frame.

12 Claims, 7 Drawing Sheets

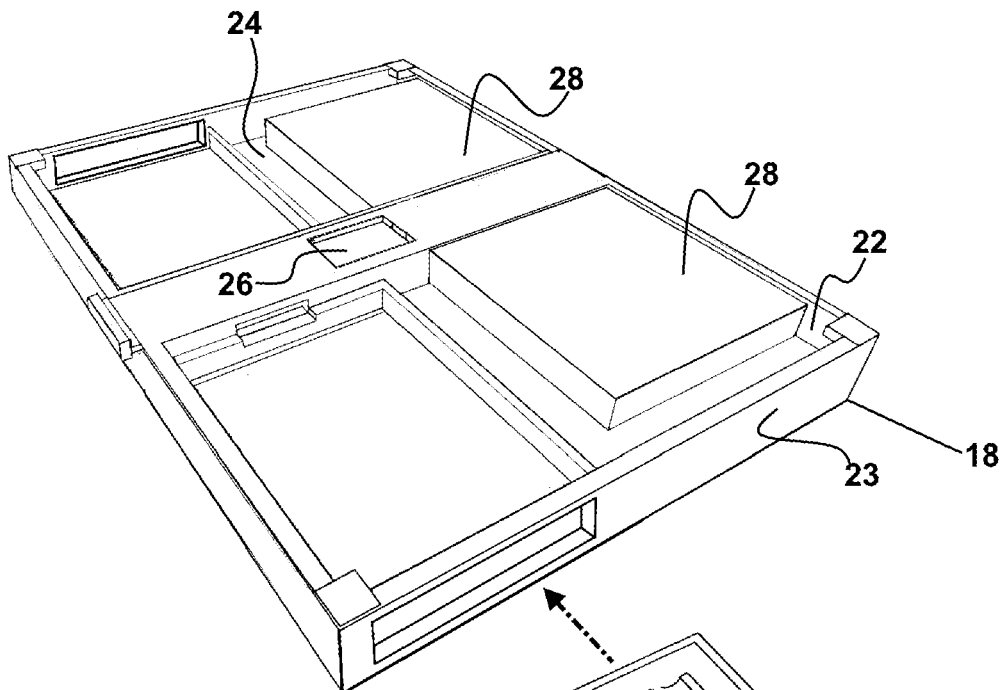
FIG. 10
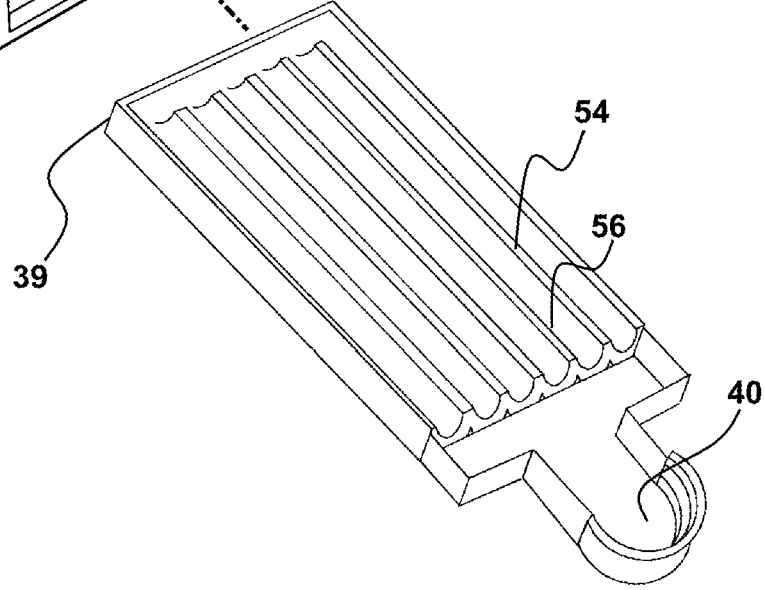

BEE NOURISHMENT SYSTEM

This application claims priority to U.S. Provisional Patent Application Ser. No. 63/194,024 filed on May 27, 2021, which is incorporated herein in its entirety by this reference thereto.

BACKGROUND OF THE INVENTION

1. Field of the Invention

The present invention relates generally to bee hives. More particularly, it relates to a bee feeding system which is configured for positioning between the brood chamber and honey super of a conventional stacked bee hive, such as, for example, and in no way limiting, the well known Langstroth type hive.

Historically, beekeeping is the formation and maintenance of bee colonies, such as modern human constructed hives. Commercially and in many homes, a beekeeper employs hives to house bees in order to collect their honey and to also collect products produced in the hive, such as wax.

While the primary purpose of bee keeping, in decades past, was for the production of honey, in the 20th century bee keeping is more often employed for crop pollination and other products, such as wax and propolis. Modernly, larger beekeeping operations have evolved into agricultural businesses which are operated for profit, where bees are kept in one location or rented out to farmers and moved about to multiple locations. In either case, honey and other products of the hives are the ultimate outcome.

As a consequence, in modern American beekeeping, hive construction has evolved to be somewhat standardized such as the configurations of what is known as a Langstroth hive. A hive of this construction is any modular beehive that is stacked vertically and has the key components, such as vertically hung frames, a bottom board with entrance for the bees, boxes containing frames for brood and for honey. In this configuration, the lowest-positioned box is employed for the queen to lay eggs in what is conventionally known as the brooding chamber. The hive boxes stacked above the brood chamber are where honey is stored by the hive. A roof or top cap is positioned atop the stack to provide weather protection.

In such a Langstroth style hive, the bees will naturally build honeycombs into frames which are housed in the stack and which can subsequently be moved with ease. These removably mounted frames allow the beekeeper to manage the bees in a way which was formerly impossible.

Modern versions of the Langstroth style hive have evolved over time and most have different dimensions from the Langstroth hive which was originally patented in 1852, the style and construction of such are included herein by this reference thereto. Modern hives while configured with slightly differing dimensions retain the main features of allowing bees attractive and designated honey and brood spaces, while still providing the keeper easy access which allows for easy management of the beehive.

In modern beekeeping, the honey produced by the bees is directly correlated to the location of the hives and the crops and flowers and the like surrounding it. To that end, the sale of honey produced by hives has taken on a branding of sorts, as to the type of honey produced from the plants surrounding the hive.

For example, manuka honey is widely marketed for its therapeutic properties from ancient civilizations. In modern times, manuka honey has been shown to aid in wound healing, epithelial regeneration, and ulcer treatments and other health benefits. However, manuka honey is a honey produced from the nectar of the manuka tree that is primarily located in New Zealand. Consequently, the supply of such honey is limited by the location of the source of plants to the bees.

The forgoing examples of related art in the field of commercial and home bee hives, and limitation related therewith are intended to be illustrative and not exclusive, and they do not imply any limitations on the bee feeding system invention described and claimed herein. Various limitations of the related art will become apparent to those skilled in the art upon a reading and understanding of the specification below and the accompanying drawings.

SUMMARY OF THE INVENTION

The system herein disclosed and described provides significant enhancement to the art of beekeeping through the provision of a bee hive nutrition device and method. The nutrition device herein is configured for positioning between a brood chamber and a honey super, in a conventional stacked hive. It features components configured to maximize nutrient uptake by the bees, while protecting them from harm while doing so such as drowning. Access and lack thereof by bees to the nutritional providing recess of the device, is switchable by the user between open access, queen blocking access, and an escape configuration allowing only exiting by any bees within the recess.

The device of the system, in all modes, includes trays having a corrugated bottom surface formed of ridges and recesses. The ridges, in a particularly preferred mode of the device, have a curved peak and in other modes ridges may be formed with planar or semi planar peaks.

The peaks and ridges provide for an increased surface area for bee feeding thereby allowing for an increased number of feeding bees in the same space while still allowing the bees to remove themselves from liquid in the recesses should they become stuck therein. Further, the tray bottom configuration of peaks or ridges surrounded by recesses forms an increased surface area to dissolve bee fondant that is formed in patties or cakes.

Also particularly preferred herein is the forming of the fondant patties in shapes that are complimentary to the shape of the bottom of the tray in which the patty is situated. The formation of the fondant patty with ridges and recesses, which match and mate with those of the tray, affords the bees the same enhancements as the configuration of the tray. Where one side of the patty will mate with and settle into the ridges and recesses of the tray, the opposite side configured with the same ridges and recesses will afford the bees the increased surface area for feeding and the ability to climb to the peaks to remove themselves from being stuck in a liquified or jelled recess.

The tray or trays employed with the device herein are situated within a recess of the rectangular frame of the insertable device. The trays themselves can slide into the recess or they can be situated within drawers that slide into and out of the recess. These trays can be used with the fondant patties in times of the year where such is needed and can be used with only water in them during a nectar flow to provide water to the bees while not diluting the nectar the bees have collected.

Additional utility is provided by the ability to custom configure the fondant formed to patties to provide the bees a source of nectar that will allow for the production of honey of a type which would not be possible were the bees to collect such from the surrounding countryside. By forming the fondant with the appropriate nutrients, when collected by the bees in the hive, honey for example such as manuka style honey can be produced by bees in hives located in areas remote to any Manuka trees. The fondant patties can be formed of nutrients to yield a honey that is substantially similar or identical to many types of specialized honey which would not be possible by the geographic location of the hive.

Finally, the configuration of the device herein provides an opening communicating with the brood chamber which may be selectively closed or filtered as to bee passage into and out of the recess housing water and or fondant in the trays. An electronic counting or monitoring system can be positioned at the centrally located opening to allow for a counting or other monitoring of bees passing through the opening. Such may be powered by a local power supply, such as a battery and can communicate wirelessly to a receiving component which has software running thereof configured to the task of counting or otherwise monitoring bees moving through the opening.

In another mode of the device, electronic weight sensors or load cells can be positioned at one or preferably a plurality of locations on the frame of the device. These weight sensors can be electronic and powered by onboard batteries or a battery located on the frame. In use the load cells can wirelessly communicate an output of data which correlates to a weight of the honey super located above the frame of the device. This allows the keeper a means for ongoing monitoring of the hive for honey production based on the discerned weight.

Finally, using the device herein can include a temperature monitoring component such as a thermistor which will monitor and communicate wirelessly an ongoing hive temperature, and can include a hygrometer which senses and wirelessly communicates data correlating to hive humidity. These ongoing outputs of information relative to hive temperature and humidity can be employed by the hive keeper to provide heat or cooling when necessary such as by using fans or heaters proximate to the hive.

With respect to the above description, before explaining at least one preferred embodiment of the herein disclosed bee hive nutrition system and device in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other hive structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined, means plus or minus ten percent.

It is an object of this invention, to provide a stacked hive positionable device, which allows for the provision of water and/or fondant to the bees in hives with stacked configurations.

It is a further object of the invention herein to provide such water and fondant in trays configured to have ridges and recesses to increase bee nourishment surface area and provide bees a safe manner to remove themselves from being trapped in water or diluted fondant.

Another object of this invention is the provision of fondant in patties which have at least one surface area formed with ridges recesses complimentary to such on a tray holding it.

It is an additional object of this invention to provide a system for feeding and watering a conventional stack bee hive which can employ specially formulated fondant to cause the bees to produce honey formulations not possible using locally positioned nectar producing plants.

It is a further object of this invention to provide such a bee hive nutritional system, which employs wireless electronic sensors to communicate counting, temperature, humidity, and other sensor monitored factors of the hive in real time.

Other objects, features, and advantages of the present bee hive nutrition system invention, as well as the advantages thereof over existing prior art, will become apparent from the description to follow, and are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the disclosed bee nutrition device and system herein. It is intended that the embodiments and figures disclosed herein are to be considered illustrative rather than limiting.

In the Drawings

FIG. 10 shows the tray of the device herein configured to a sliding engagement through a frame opening and into the frame recess.

Figure 1:
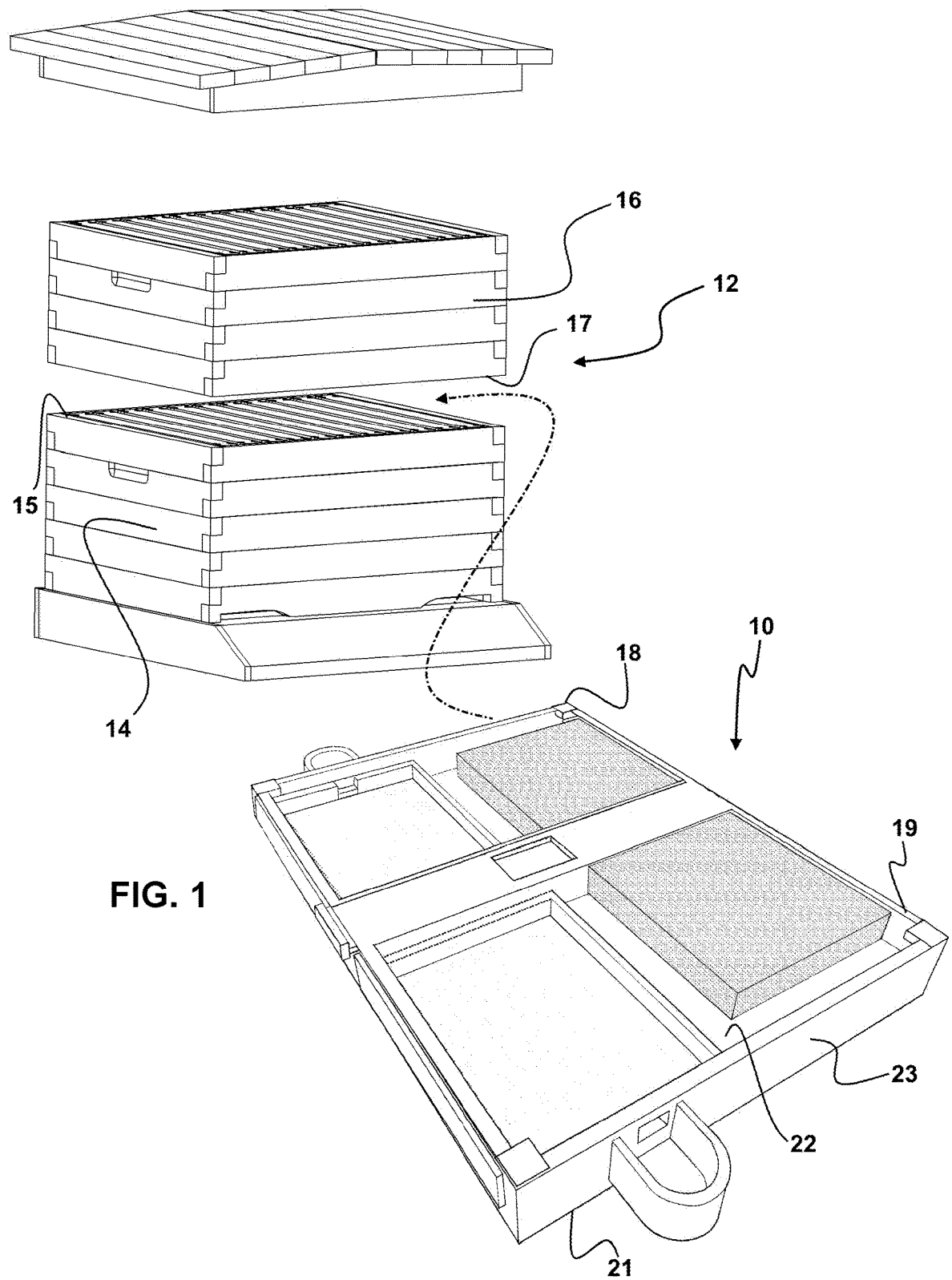
FIG. 1 shows a conventional stacked hive where the device herein is configured for positioning between an underlying brood chamber and at least one overhead honey super.

Other aspects of the present bee nutrition system herein shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only, and they are not intended to be limiting or to imply that the device has to be used or positioned in any particular orientation.

Now referring to drawings in FIGS. 1-11, wherein similar components are identified by like reference numerals, there is seen in FIG. 1, a conventional stacked hive where the device 10 herein is configured for positioning between an underlying brood chamber 12 and at least one overhead honey super 14. As noted, such conventional stacked hives 12 may vary in exterior dimensions and as such, the device 10 will have a frame 18 dimensioned for positioning between the rectangular hive sections. By positioned between is meant that the frame 18 will be dimensioned to be sandwiched between the top surface 15 of the perimeter edge of the brood chamber 14 and the bottom surface of the perimeter edge of the honey super 16. In this fashion, once operatively engaged, the frame 18 will have the weight of the honey super 16 and will compress upon the top surface 19 of the frame 18, and the bottom surface 21 of the frame 18 will compress upon the top surface 15 of the brood chamber 14.

In this sandwiched engagement little or no gaps are formed between the top surface 19 and bottom surfaces 21 of the frame 18 and the bottom surface 17 of the rectangular honey super 16 and top surface 15 of the underlying brood chamber 12. Ideally, the perimeter dimensions of the frame 18 are substantially the same as the perimeter dimensions to the brood chamber 14 and honey super 16.

Figure 2:
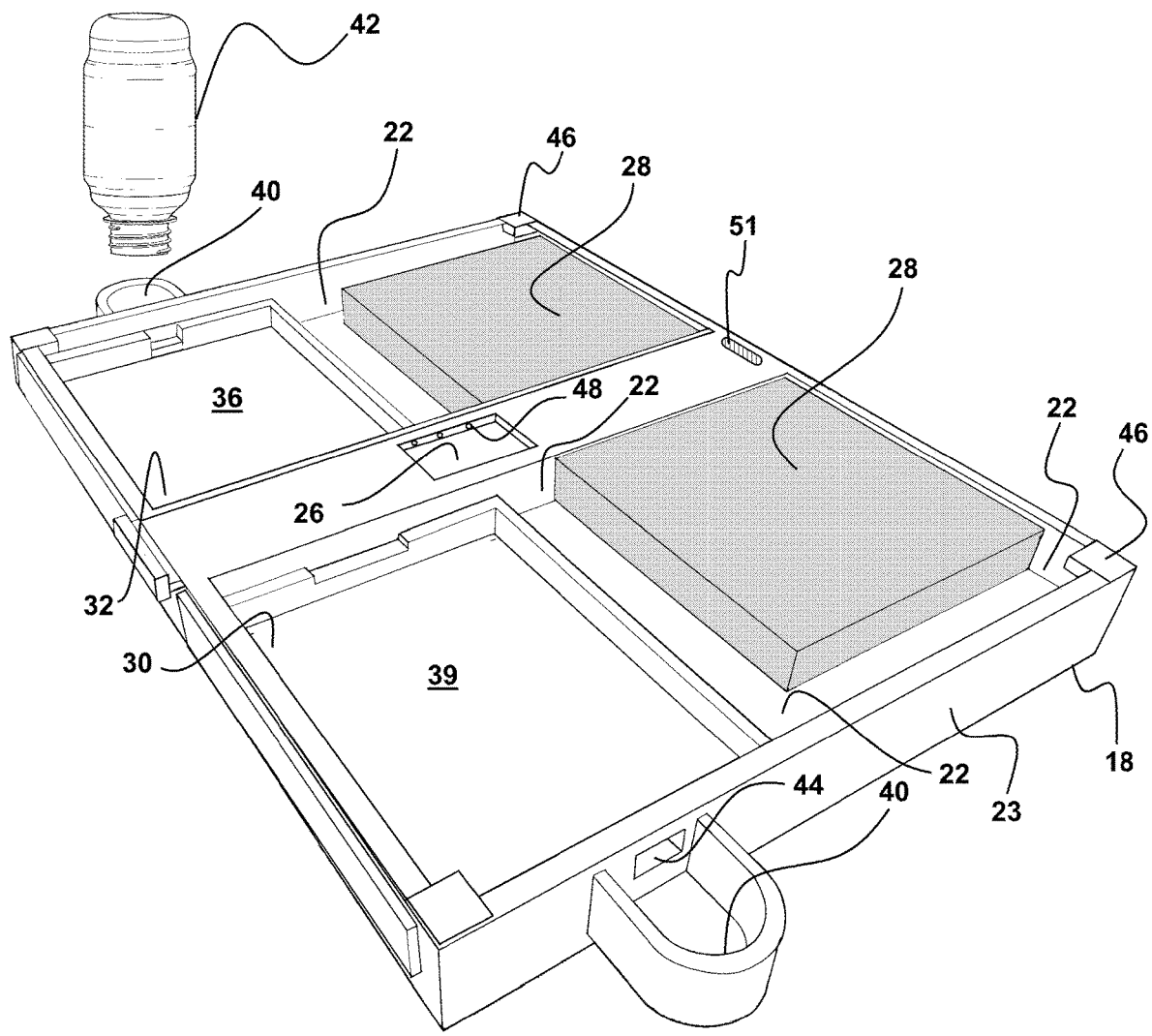
FIG. 2 depicts an overhead perspective view of the device showing the body of the device having a rectangular frame surrounding an interior cavity on one side and having a centrally located opening which communicates through a planar bottom surface of the frame.

Shown in FIG. 2 is the device 10 showing the frame 18 having four sides and having a recess 22 formed in between the four side walls of the frame 18 and above a bottom surface 24 of the frame 18. A central opening 26 communicates through the bottom surface 24. Also shown are two sections 28 which may be positioned within the recess 22. These sections 28 can be removed should additional space be needed in the recess 22 but are preferred to maintain the space they occupy filled to deter the bees from attempting to fill the occupied area with wax or the like which they are inclined to do.

Figure 4:
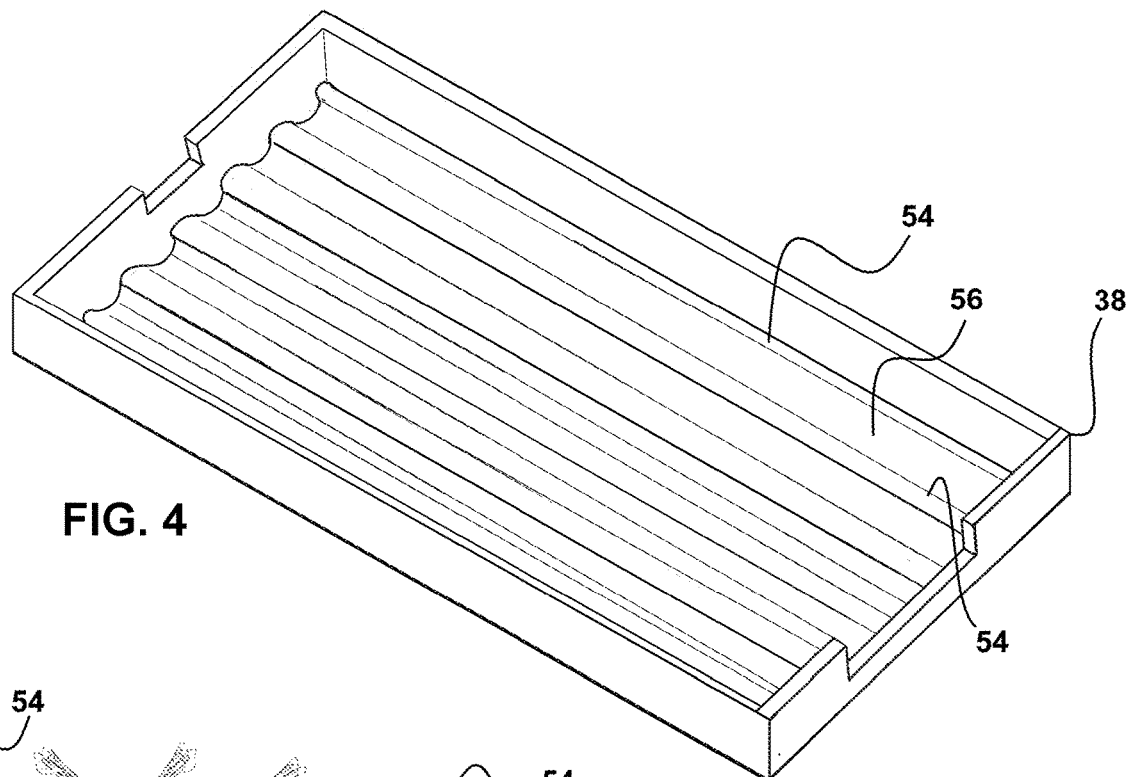
FIG. 4 shows an overhead view of a mode of the tray having a surface of ridges and recesses.

Shown also in FIG. 2 are a first area 30 and a second area 32. A first cavity 34 in the first area 30 and a second cavity 36 of the second area 32 are both dimensioned for positioning of a tray 38 such as shown in FIG. 4 therein. Preferably the trays 36 or 39, are slidingly engageable into the first area 30 and second area 32. This allows for easy loading of fondant or water or liquid into them, as needed, wherein they can be slid out and slid back into position loaded. By slidingly engageable is meant that the tray 39 itself slides through the sidewall 23 of the frame 18, or the trays 38 are positionable in a first drawer cavity 34 and a second drawer cavity 36 wherein they can slide in and out with the drawers. In some modes of the system herein a single tray 36 or 39 might be employed rather than two.

Also preferred, in all modes of the device 10, is the provision for communicating a supply of liquid to the tray 36 or 39. As shown in FIG. 2, the frame 18 is configured to operatively engage with a fluid container 42 such as a water bottle. By operatively engage is meant that the fluid container 42 will connect to the fluid supply mount 40 and communicate liquid from the container into a tray 36 or tray 39. As shown in FIG. 2, for example, the fluid supply mount 30 is on the frame 18 and communicates fluid through an opening 44 to any tray within the frame 18. In FIG. 10 the tray 39 has the fluid supply mount 40 built into the tray 39. The fluid supply mount 40 in all modes of the system herein will engage with the fluid container 42 such as with threaded engagement or frictional engagements in a sealed removable connection to allow it to be removed and refilled.

Additionally shown in FIG. 2 is an optional weight sensors 46 or load cells positioned on the tray 18. These weight sensors 46 may be electronic and wirelessly configured and powered by onboard batteries or a battery located on the frame 18. In use the one or plurality of weight sensors 46 will use WiFi or blue tooth or the like to wirelessly communicate an output of data which correlates to a weight of the honey super 16 located above the frame 18. This will allow the keeper to discern the amount of honey in the super based on the communicated weight.

Also shown in FIG. 2 is an electronic counting or monitoring system gate 48 which is positioned at the central opening 26. This will allow for a counting or other monitoring of bees passing through the central opening 26. Such may be powered by a local power supply such as a battery and is best configured with wireless communication ability to broadcast sensed data as to bees moving through the central opening 26 to a receiving component which has software running thereof configured to the task of using that broadcast data for counting or otherwise monitoring bees moving through the central opening 26. A basic arduino board can be housed in the frame where a multitude of such sensors can be connected, as well as blue tooth or wifi connectivity. Additionally useful is the positioning a multiple sensors 51 such as a thermistor for hive temperature and hygrometer for humidity. These too can be wirelessly enabled to communicate data to a remote receiver wherein the keeper can monitor bee movement, and hive temperature and humidity.

Figure 3:
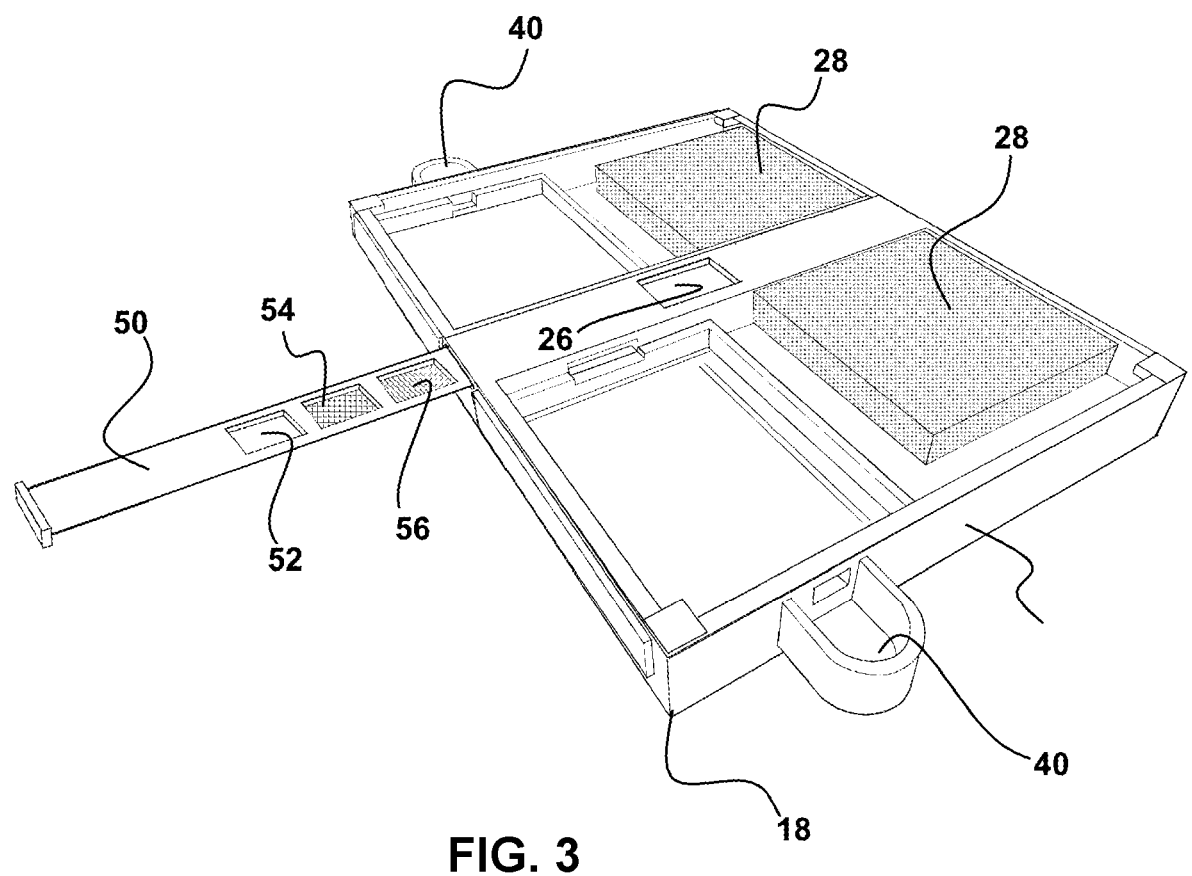
FIG. 3 depicts an overhead view of the tray of FIG. 2 and shows the central opening communicating through the bottom surface which is selectively closed using the translating member having a plurality of openings therein configured for different movement therethrough.

The device 10, as in FIG. 2, is shown in FIG. 3 in an overhead view which also shows that the central opening 26 communicating through the bottom surface 21 of the frame 18, may be selectively opened or closed using a translating member 50 slidingly engaged through the sidewall 23. The translating member 50 aligns with the central opening 26 and has three positionable apertures to regulate travel by bees through the central opening 26. A first aperture 52 is totally open and when aligned with the central opening 26 will allow bee travel into and out of the top of the frame 18 and the recess 22 between the sidewall 23 and bottom surface 24. A second aperture 54 has a perforated barrier within the second aperture 54 where the perforations are sized to prevent the queen from moving through them which prevents the queen bee from moving through the central opening 26. A third aperture 56 when positioned to alignment with the central opening 26 by sliding the translating member 50, has a filter therein allowing only travel by bees out of the upper surface and recess 22 of the frame 18 and back into the brood chamber 14.

Figure 5:
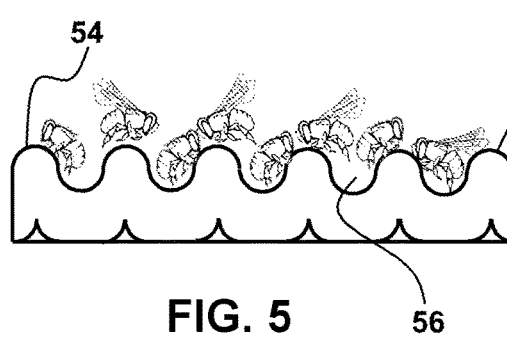
FIG. 5 is a sectional view of the tray of FIG. 4 showing the increased surface area for bees.
Figure 6:
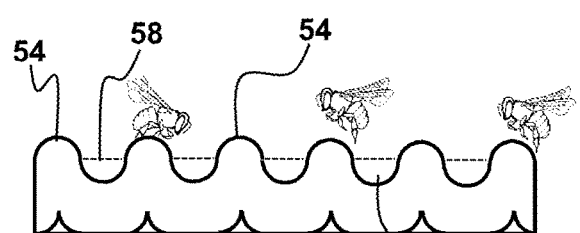
FIG. 6 depicts a sectional view of the tray surface showing liquid such as water positioned in the recesses wherein the bees can position themselves on the ridges therebetween.

FIGS. 4-6 depict a preferred configuration of the tray 36 or 39 herein, which has ridges 54 extending across the surface of the tray 38 or 39, which have recesses 56 on one or both adjacent sides of the ridges 54. As shown in FIGS. 5-6, a curved surface at the peak of the ridges 54 is especially preferred as the curved recesses and curved ridges form a significantly larger surface area for bees to feed. Additionally, the placement of ridges 54 adjacent the recesses 56 where liquid or water is positioned to feed the bees, allows the bees high ground to escape from the liquid 58 should they get too wet or caught in the liquid when its nectar or the like. While the curved surface at the peak is preferred as it has been shown to be easier to crawl upon and less likely to injure bees thereon, the planar surface of the peak of the ridges 54 adjacent the curved recesses 56 can also be employed to provide the safe area for bees to seek from fluid in the recesses.

Figure 7:
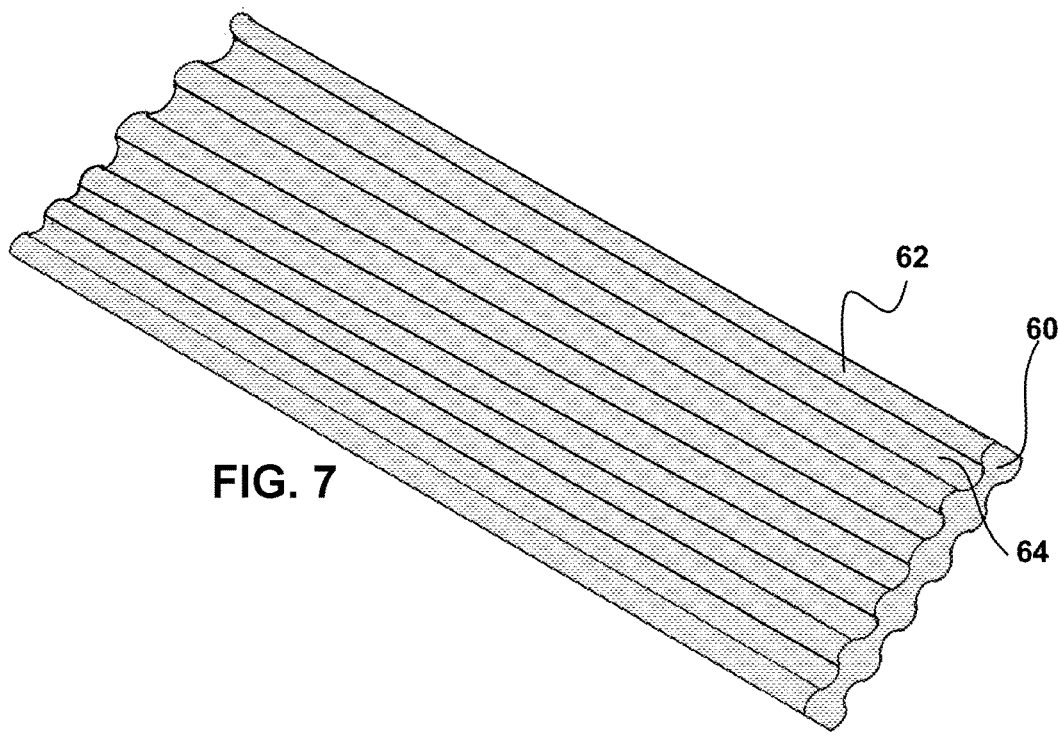
FIG. 7 is an overhead view of a fondant patty of the system herein showing the exterior top and bottom surfaces having ridges and recesses which are complimentary to the tray surface ridges and recesses.
Figure 8:
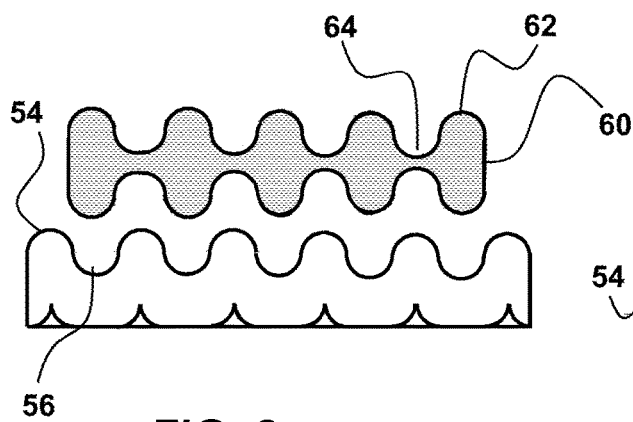
FIG. 8 shows the fondant patty of FIG. 7 located to be positioned within the tray surface.
Figure 9:
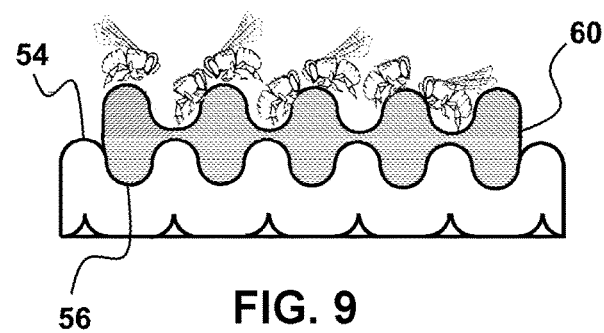
FIG. 9 shows the fondant of FIG. 7 positioned in a tray and shows the ridges and recesses of the upper surface of the fondant patty.
Figure 11:
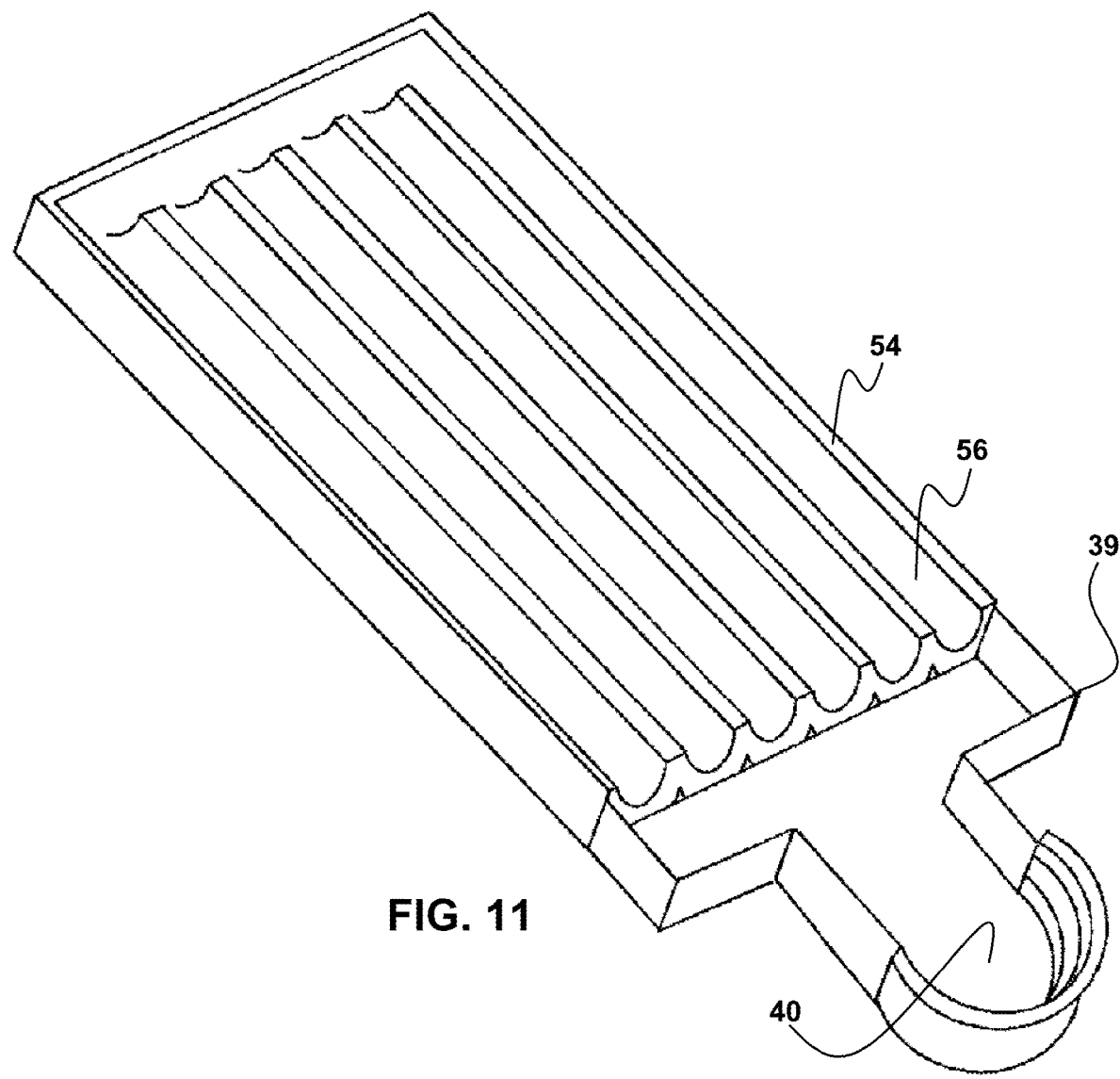
FIG. 11 shows an overhead view of the sliding tray of FIG. 10 wherein the ridges are more planar than those of FIGS. 4-6.

Shown in FIGS. 7-9 are views of a particularly preferred shape and configuration of the fondant 60 which is positionable on a tray to feed the bees. Preferably, the fondant 60 is formed to a patty or cake which has fondant ridges 62 which are complimentary in shape to the tray recesses 56, and the fondant 60 has fondant recesses 64 complimentary in shape to the tray ridges 54. Such allows fondant 60 patties to be securely positioned within a tray 36 or 39, and with ridges and recesses of both engaged. Such a configuration also positions a top surface of such an engaged fondant 60 patty for bee nourishment, which provides significantly more surface area for the bees to congregate on than a planar surface and provides the fondant ridges 62 as an escape or safe area for bees who may need it. Should the ridges 54 be more of a planar peak, as in FIGS. 10 and 11, the surface of the fondant 60 patty would be complimentary in shape to such.

As noted above, the tray 39 with the preferred curved ridges 54 or more planar ridges can be slidably engageable into the recess 22 surrounded by the sidewall 23 of the frame 18, by a sliding engagement through the sidewall 23. In the depicted mode of the tray 39 of FIGS. 10-11, the fluid support mount 40 can be integral or part of the tray 39 and will project away from the exterior of the sidewall 23 once the tray 39 is slidingly engaged. Thereafter, the fluid container 42 can be operatively engaged with the fluid supply mount 40 and provide liquid such as water or syrup to the recesses 56 on the tray 39 while it is positioned within the recess 22 of the frame 18 within the sidewall 23.

Because the system herein can be employed to provide syrup to the bees in the hive, which they convert to honey, in a preferred mode of the system, the fondant 60 can be formed in a formula which allows the bees of the hive, to produce a honey variant which would not be possible where the bees use surrounding vegetation for such.

In a particularly preferred mode for producing a honey variant, a manuka honey can be produced by the bees who are provided fondant 60 in a formula that has shown in experimentation when provided to bees, to yield manuka honey where such is not possible using surrounding vegetation.

Currently, a preferred mixture for the formed fondant 60 patties to yield manuka style honey when provided to bees in a hive using the device 10 herein, is a mixture including the following in percentages by volume of the total mixture:
  10-15% water
  0.01-5% Dihydroxyacetone (DHA)
  0.01-5% Lysine
  0.001-0.05% Lemongrass oil
  75-90% glucose Using the above mixture, the Dihydroxyacetone (DHA) in the production of the honey undergoes a catalyzed reaction (a fermentation process) involving the Lysine. This fermentation process increases the speed of conversion of the DHA into Methylglyoxal (MGO) in the produced honey, which is the primary antimicrobial constituent in Manuka honey. The lemongrass oil in experimentation has also shown to increase feeding behavior of the bees to increase patty gathering, and subsequent storage in comb. Using fondant formed with the above mixture, the bees thus will produce a honey which is substantially the equivalent of manuka honey which currently is only available from bee hives located in New Zealand.

This invention herein has other applications, potentially, and one skilled in the art could discern such upon a reading of this specification. The explication of the features of this invention does not limit the claims of this application and other applications developed by those skilled in the art will be included in this invention.

It is additionally noted and anticipated that although the device is shown in its most simple form, various components and aspects of the device may be differently shaped or slightly modified when forming the invention herein while still providing a similar utility and function. As such those skilled in the art will appreciate the descriptions and depictions set forth in this disclosure are meant to portray examples of preferred modes of the bee nutrition system herein within the overall scope and intent of the invention, and are not to be considered limiting in any manner.

Further, while all of the fundamental characteristics and features of the invention have been shown and described herein, with reference to particular embodiments thereof, a latitude of modification, various changes and substitutions are intended in the foregoing disclosure as well as the claims which follow, and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A bee nutrition system for employment on combination with a stack bee hive, comprising:
    a frame, said frame having a recess positioned between four sidewalls extending above a bottom surface of said frame;
    said frame configured for a positioning between an underlying brood chamber and an overhead honey super of a conventional stacked bee hive;
    a central opening communicating through said bottom surface of said frame; and
    a supply mount configured to engage with a fluid container;
    at least one tray sized for positioning within said recess;
    a member translatable through one of said sidewalls;
    said member having a first aperture communicating therethrough;
    said member translatable to a first aligned position with said first aperture aligned with said central opening;
    said first aperture in said first aligned position thereof forming a first path for bee travel through said central opening and said first aperture into said recess of said frame;
    said member having a second aperture communicating therethrough;
    said member translatable to a second aligned position having said second aperture aligned with said central opening;
    said second aperture having a perforated barrier therein having individual perforations sized to prevent passage of a queen bee therethrough; and
    said supply mount communicating fluid from a said fluid container when engaged therein, to said tray.

2. The bee nutrition system of claim 1 additionally comprising:
    said supply mount positioned on an exterior of one of said four sidewalls.

3. The bee nutrition system of claim 1 additionally comprising:
    said supply mount positioned on an end of said tray in a position projecting from an exterior surface of one of said four sidewalls, when said tray positioned within said recess.

4. The bee nutrition system of claim 1 additionally comprising:
    said tray having a plurality of tray ridges therein; and
    tray recesses positioned in between said tray ridges for receiving said fluid communicated to said supply mount from said fluid container.

5. The bee nutrition system of claim 2 additionally comprising:
    said tray having a plurality of tray ridges therein; and
    tray recesses positioned in between said tray ridges for receiving said fluid communicated to said supply mount from said fluid container.

6. The bee nutrition system of claim 3 additionally comprising:
    said tray having a plurality of tray ridges therein; and
    tray recesses positioned in between said tray ridges for receiving said fluid communicated to said supply mount from said fluid container.

7. The bee nutrition system of claim 4 additionally comprising:
    fondant cakes for positioning within said tray;
    said fondant cakes having a plurality of fondant ridges which are complimentary in shape to said tray recesses; and
    said fondant cakes having a plurality of fondant recesses which are complimentary in shape to said tray ridges.

8. The bee nutrition system of claim 5 additionally comprising:
    fondant cakes for positioning within said tray;
    said fondant cakes having a plurality of fondant ridges which are complimentary in shape to said tray recesses; and
    said fondant cakes having a plurality of fondant recesses which are complimentary in shape to said tray ridges.

9. The bee nutrition system of claim 6 additionally comprising:
    fondant cakes for positioning within said tray;
    said fondant cakes having a plurality of fondant ridges which are complimentary in shape to said tray recesses; and
    said fondant cakes having a plurality of fondant recesses which are complimentary in shape to said tray ridges.

10. The bee nutrition system of claim 1 additionally comprising:
    said member having a third aperture communicating therethrough;
    said member translatable to a third aligned position having said third aperture aligned with said central opening; and
    said third aperture having a filter therein allowing only one way travel therethrough in a direction from said recess to said brood chamber.

11. The bee nutrition system of claim 1 additionally comprising:
    an electronic monitor positioned within said central opening for counting a number of bees passing therethrough.

12. The bee nutrition system of claim 1 additionally comprising:
    a temperature sensor configured to electronically communicate a hive temperature.

* * * * *